United States Patent [19]
Wu et al.

[11] Patent Number: 5,757,545
[45] Date of Patent: May 26, 1998

[54] LENTICULAR AND BARRIER STRIP PICTURES WITH CHANGEABLE SCENES

[75] Inventors: Augustine Ka-Cheung Wu, Gwinnett County, Ga.; Kenneth Quochuy Lao, Union County, N.J.

[73] Assignee: Image Technology International, Inc., Norcross, Ga.

[21] Appl. No.: 653,509

[22] Filed: May 24, 1996

[51] Int. Cl.$^6$ .................... G02B 27/22; G03B 25/02; G09F 19/13

[52] U.S. Cl. .................... 359/463; 359/464; 434/426; 40/454

[58] Field of Search .................... 359/464, 463, 359/462, 467, 468, 469, 619; 434/426; 40/454

[56] References Cited

U.S. PATENT DOCUMENTS

| | | | |
|---|---|---|---|
| 2,313,947 | 3/1943 | Klinkum | 359/463 |
| 2,514,814 | 7/1950 | Towne | 40/454 |
| 2,915,843 | 12/1959 | Pabst | 40/454 |
| 3,314,179 | 4/1967 | Leach | 40/454 |
| 4,944,572 | 7/1990 | Young | 40/454 |
| 5,035,929 | 7/1991 | Myers et al. | 40/454 |
| 5,461,495 | 10/1995 | Steenblik et al. | 359/463 |
| 5,465,175 | 11/1995 | Woodgate et al. | 359/462 |
| 5,554,432 | 9/1996 | Sandor et al. | 359/463 |
| 5,588,526 | 12/1996 | Fantone et al. | 359/463 |

OTHER PUBLICATIONS

N.A. Valyus "Stereoscopy" 1962 P.195–P.198 (1962).
SID 95 Digest, P.55. "3D Display with Large Double Lentricularsaeen"(1995).

*Primary Examiner*—Jon W. Henry
*Attorney, Agent, or Firm*—Kenneth Q. Lao

[57] ABSTRACT

This disclosure is concerned with a lenticular or barrier strip picture with changeable scenes wherein a trimmed lenticular screen or a barrier strip plate is used to view a composite image. On a conventional lenticular picture, the focal plane of the lenticules on the lenticular screen coincides with the backside of the lenticular screen and, therefore, the composite image must be placed in contact with the backside of the lenticular screen. On the lenticular picture according to the present invention, the thickness of the lenticular screen is trimmed such that the focal plane of the lenticules is located further away from the backside of the lenticular screen. In order that a composite image can produce a properly focused composing scene when viewed through the trimmed lenticular screen, it must be positioned on the focal plane of the lenticules away from the backside of the screen, leaving an airgap therebetween. With in such an airgap, a holding plate is disposed to hold down said composite image. Preferably, the holding plate is movably mounted to allow the composite image to be changed out and replaced by another composite image.

8 Claims, 6 Drawing Sheets

5,757,545

LENTICULAR AND BARRIER STRIP PICTURES WITH CHANGEABLE SCENES

FIELD OF THE INVENTION

The present invention is related to 3D pictures or animation pictures which use a lenticular screen or a barrier strip plate for viewing.

PRIOR ART

In a conventional lenticular picture, the composite image which is composed from two or more 2D images is firmly attached to the backside of a lenticular screen for viewing. A lenticular screen is a sheet of transparent material, the backside of which is flat while the front side is embossed or formed with a contiguous array of cylindrical lenses, or lenticules, with parallel longitudinal axes and a common focal plane. The thickness of the lenticular screen is designed such that the backside of the screen coincides with the focal plane of the lenticules. As shown in FIG. 1, when a substantially parallel light beam encounters a lenticular screen on the lenticule side at a small incident angle, the beam will be focused by each of the lenticules, forming an array of narrow lines, one on the base of each lenticule. With such a lenticular screen, the thickness of the lenticular screen is equal to the focal length of the lenticules as measured from the lenticule surface. Such thickness is hereafter referred to as the confocal thickness.

Using a lenticular screen having a confocal thickness to view a composite image, the composite image must be properly placed in contact with the backside of the lenticular screen. In general, a composite image with interleaving image lines orderly extracted from two or more 2D images is printed on a sheet of paper and is firmly attached to the screen after it is produced, or the composite image is exposed on photosensitive emulsion layers which have been directly coated on the back side of the screen. Because of the contacting requirement, the composite image is difficult to change out or to be replaced with another composite image. Thus, the composing scene on a conventional lenticular picture is not changeable.

It is advantageous to produce a lenticular picture wherein the composite image can be easily replaced to change the composing scene.

SUMMARY OF THE INVENTION

It is an objective of the present invention to provide a lenticular picture wherein the composite image can be easily replaced to change the composing scene.

It is another objective of the present invention to provide a lenticular viewing box for inserting a composite image to become a lenticular picture wherein the composite image can be replaced to change the composing scene.

The above objectives can be readily achieved by using a lenticular screen, the thickness of which is smaller than the confocal thickness, to view a composite image. Such a lenticular screen shall be hereafter referred to as a trimmed lenticular screen. On a trimmed lenticular screen, the focal plane of the lenticules is further away from the backside of the lenticular screen. In order that the lenticules on a trimmed lenticular screen properly focus on the composite image, the composite image must be placed on the focal plane of the lenticules, away from the backside of the lenticular screen, leaving an airgap therebetween.

With an airgap existing between the lenticular screen and the composite image, the composite image can be easily inserted under the screen for viewing and it is equally easy to be replaced by another to change the composing scene. With a trimmed lenticular screen, two or more composite images can be used to produce different scenes on a 3D picture or animation picture. Preferably, only one composite image is positioned under a trimmed lenticular screen at a time.

An additional advantage of a trimmed lenticular screen is that when the thickness of the lenticular screen is much smaller than the confocal thickness, the weight and cost of the screen are also substantially reduced.

The composite image can be lithographically or photographically produced, or printed by a digital printer such as a laser printer, an inkjet printer, a thermal wax printer or a dye-sublimation printer.

DETAILED DESCRIPTION OF THE DRAWINGS

Figure 1:
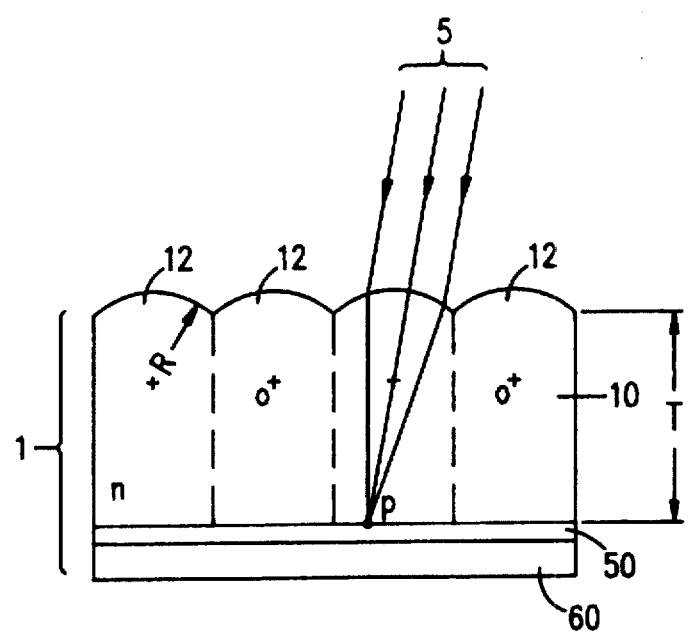
FIG. 1 illustrates a prior art lenticular picture wherein the viewing lenticular screen has a confocal thickness.

FIG. 1 illustrates a prior art lenticular picture wherein the viewing lenticular screen has a confocal thickness. As shown in FIG. 1, a lenticular picture 1 comprises a lenticular screen 10, a composite image 50 and a layer of backing material 60. The lenticular screen 10 is sheet of transparent material having a flat backside and a front side having a contiguous array of cylindrical lenses 12 known as lenticules. The radius of curvature and the center of curvature of each lenticule are denoted, respectively by letters R and O. The thickness of the lenticular screen 10 as measured from the lenticule surface is denoted by T. The thickness of the lenticular screen is designed such that when a substantially parallel light beam encounters a lenticular screen on the lenticule side at a small incident angle, the beam will be focused by each lenticule on the base thereof. As shown in FIG. 1, a light beam 5 encounters one of the lenticules 12 and is focused at a point p on the backside of the lenticular screen 10. With such a thickness, the backside of the lenticular screen 10 coincides with focal plane of the lenticules 12. If the refractive index of the lenticular screen material is n, then the thickness T of the lenticular screen is given by $$T = nR/(n-1)$$

The thickness as determined by the above equation is referred to as the confocal thickness.

It is well-known that a composite image composed from two or more 2D views for making a 3D picture or animation picture under lying a lenticular screen or a barrier strip plate is a line-form image. Such a line-form image comprises an array of interleaving image lines extracted from the 2D views. In order that the composite image 50 produces a focused picture as viewed through the lenticular screen 10, the composite image must be placed in contact with the backside of the screen 10 and the image lines be properly aligned with the lenticules 12. Usually, the composite image 50 is printed on a separate sheet of paper and then firmly and properly attached to the backside of the screen. The composite image 50 can also be photographically exposed on photosensitive emulsion layers which have been coated or attached on the backside of the lenticular screen 10. A layer of backing material 60 may be applied or attached to the back of the composite image 50 to enhance the viewing of the composite image and to support the composite image.

Figure 2A:
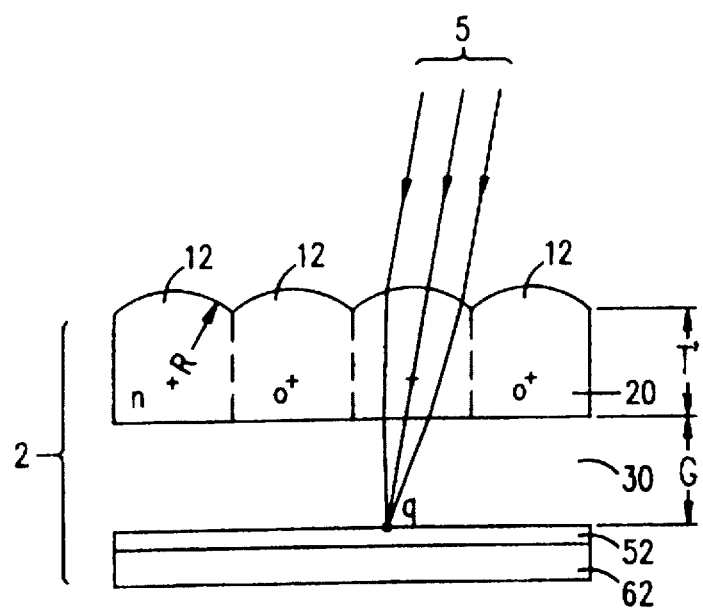
FIG. 2A illustrates the lenticular picture according to the present invention wherein a trimmed lenticular screen is used for viewing.

FIG. 2A illustrates the lenticular picture according to the present invention wherein a trimmed lenticular screen is used for viewing. As shown in FIG. 2A, the lenticular picture 2 comprises a composite image 52, a supporting plate 62, and a trimmed lenticular screen 20 having a contiguous array of lenticules 12. The thickness T' of the trimmed lenticular screen 20 is smaller than the confocal thickness. As shown in FIG. 2A, a substantially parallel light beam 5 encounters one of the lenticules 12 and is focused thereby at a point q on the focal plane of the lenticules. Thus, the focal plane of the lenticules 12 is further away from the backside of the trimmed lenticular screen 20 In order that the composite image 52 can properly produce a focused image when viewed through the lenticular screen 20, it must be placed on the focal plane of the lenticules, away from the backside of the lenticular screen 20, leaving an airgap 30 therebetween. The breadth of the airgap 30 is denoted by letter G.

If the refractive index of the lenticular screen material is n, then the proper breadth G of the airgap 30 is given by $$G=R/(n-1)-T/n$$

where R is radius of curvature of the lenticules 12. It is preferred that the composite image 52 is made on a sheet of sturdy material and is supported by a proper supporting plate 62 so that the airgap 30 can maintain a constant breadth G throughout the composite image.

With an airgap between the composite image 52 and the viewing lenticular screen 20, a composite image of one composing scene can be easily changed out and replaced by a composite image of another composing scene.

Figure 2B:
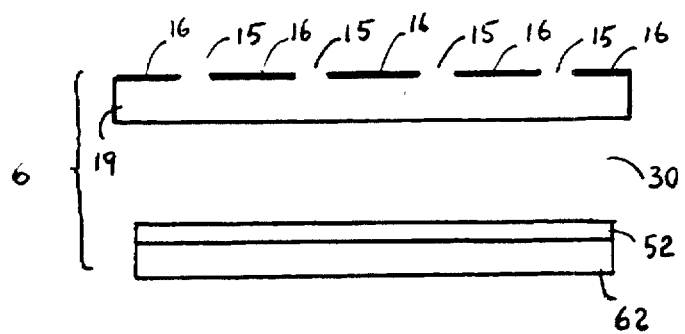
FIG. 2B illustrates a barrier-strip picture wherein a trimmed barrier strip is used for viewing.

FIG. 2B illustrates a barrier-strip picture wherein a trimmed barrier strip plate is used for viewing. Similar to the lenticular screen 20 having lenticules 12 in a lenticular picture 2 in FIG. 2A, a barrier strip plate 19 having linear blocking strips 16 and clear strips 15 is used for viewing the composite image 52 in a barrier strip picture 6. In FIG. 2B, the barrier strip plate 19 is disposed above the composite image 52, leaving an airgap G in between. If the center-to-center distance between two adjacent clear strips 15 is equal to the center-to-center distance between two lenticules 12 in the lenticular screen 20 in FIG. 2A, then the barrier strip plate 19 can replace the lenticular screen 20 in FIG. 2A. The blocking and the clear strips on the barrier strip plate shown in FIG. 2B are located on the upper side of the plate 19. However, these strip s can also be located on the lower side of the plate 19.

Figure 3:
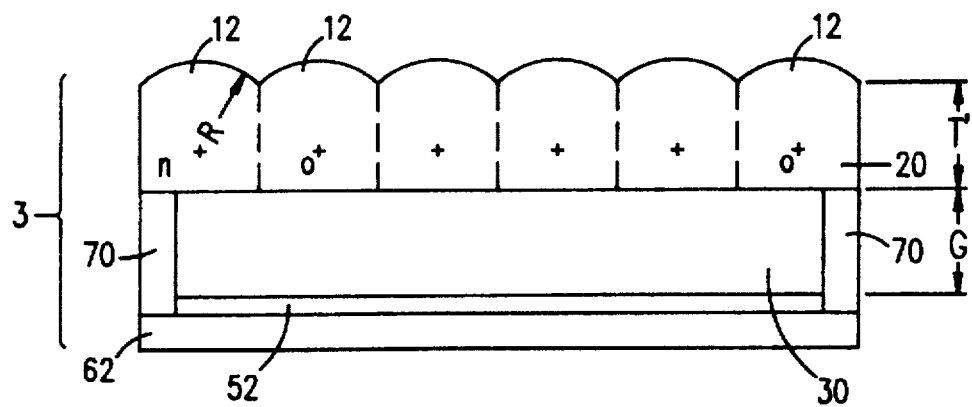
FIG. 3 illustrates the lenticular viewing box with a trimmed lenticular screen. A pair of guiding blocks being used to help aligning a composite image with the viewing lenticular screen.

FIG. 3 illustrates the preferred embodiment of the lenticular viewing box, according to the present invention. As shown in FIG. 3, a lenticular viewing box 3 comprises a trimmed lenticular screen 20, and a pair of guiding blocks 70 positioned between the backside of the lenticular screen 20 and the supporting plate 62. Preferably, the guiding blocks 70 are positioned on the two sides of the viewing box 4 parallel to the longitudinal axes of the lenticules so they can be used for guiding a composite image 52 when it is inserted into the viewing box 3 for making a lenticular picture. The guides are useful for properly aligning the image lines on the composite image 52 with the lenticules 12. The guiding blocks 70 are also used as a pair of spacers to define the breadth G of the airgap 30 after taking into consideration the thickness of the composite image 52 so that the composite image 52 is properly located on the focal plane of the lenticules 12.

It should be noted that the lenticular screen 20 can be replaced by a barrier strip plate as illustrated in FIG. 2B to make a barrier-strip picture.

Figure 4:
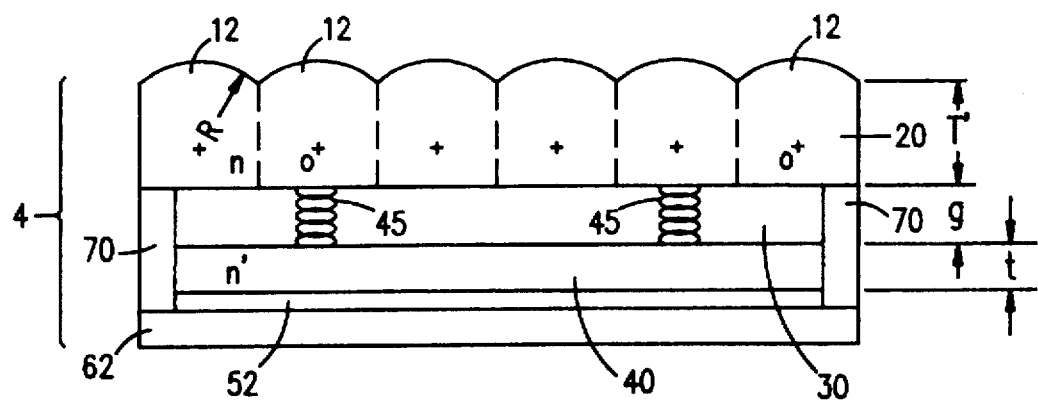
FIG. 4 illustrates another embodiment of the lenticular viewing box wherein a flat plate is used for holding down a composite image inserted thereunder.

FIG. 4 illustrates another embodiment of the lenticular viewing box, according to the present invention. As shown in FIG. 4, the lenticular viewing box 4 comprises a trimmed lenticular screen 20, a pair of guiding blocks 70, a supporting plate 62 and a flat transparent holding plate 40 disposed between the guiding blocks 70. The holding plate 40 is used for pressing down a composite image 52 after it is inserted into the viewing box 4 between the holding plate 40 and the supporting plate 62. As shown in FIG. 4, an airgap 30 also exists between the holding plate 40 and the backside of the lenticular screen 20. If the thickness and the refractive index of the holding plate 40 are denoted by t and n', respectively, then the breadth of the airgap 30 is reduced to g as given by the following equation:

$$g=R/(n-1)-T/n-t/n'$$

where T'and n denote, respectively, the thickness and the refractive index of the trimmed lenticular screen 20, and R denotes the radius of curvature of the lenticules 12 on the lenticular screen 20. The guiding blocks 70 also define the breadth of the airgap 30 after taking into consideration the thickness of the holding plate 40 and the thickness of the composite image 52 so that the composite image 52 is properly located on the focal plane of the lenticules 12. Preferably, a plurality of recoiling means such as springs 45 are positioned between the lenticular screen 20 and the holding plate 40 to help holding down the composite image 52.

Figure 5:
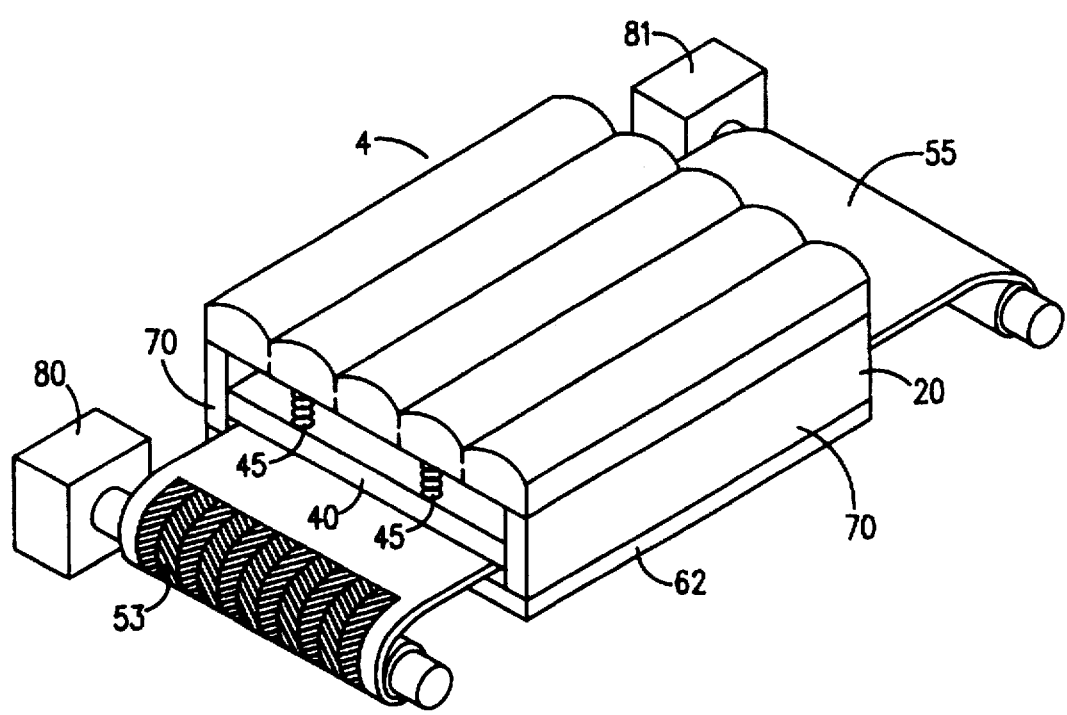
FIG. 5 illustrates a method of providing a plurality of composite images to a lenticular viewing box for making a lenticular picture with changeable scenes.

FIG. 5 illustrates a method of providing a plurality of composite images for making a lenticular picture with changeable scenes. As shown in FIG. 5, composite images are provided to a lenticular viewing box 4 in a long roll 55 which contains a plurality of composite images one of which is denoted by numeral 53. The lenticular viewing box 4 comprises a trimmed lenticular screen 20, a holding plate 40, a supporting plate 62, and a pair of guiding blocks 70. The composite images are fed between the holding plate 40 and the supporting plate 62, from one end of the viewing box to another end. To make a lenticular picture, driving means 81 and 82 drive the image roll 55 until a desired composite image is properly positioned under the lenticular screen 20. To change the composing scene, driving means 81 and 82 drive the image roll 55 to select another composite image. It is understood that the width of image roll 55 properly fits between the guiding blocks 70 and composite images printed on the image roll 55 are designed such that the image lines on the composite images are properly aligned with the lenticules of the lenticular screen 20. Furthermore, the supporting plate 40 properly presses down the composite image by a plurality of recoiling means 45.

Figure 6:
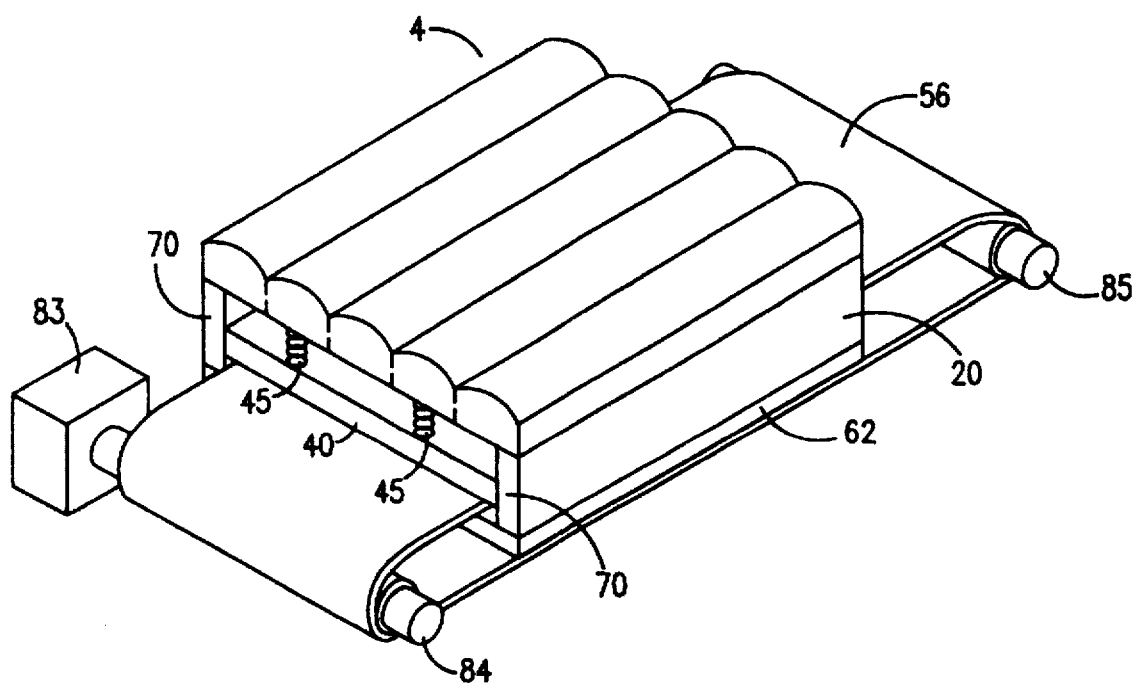
FIG. 6 shows another method of producing a lenticular picture with change able scenes.

FIG 6 shows another method of producing a lenticular picture with changeable scene, similar to that illustrated in FIG 5. In FIG. 6, composite images are printed on a continuous loop 57 which is looped around a pair of rollers 85 and 86 and driven by driving means 83.

Figure 7:
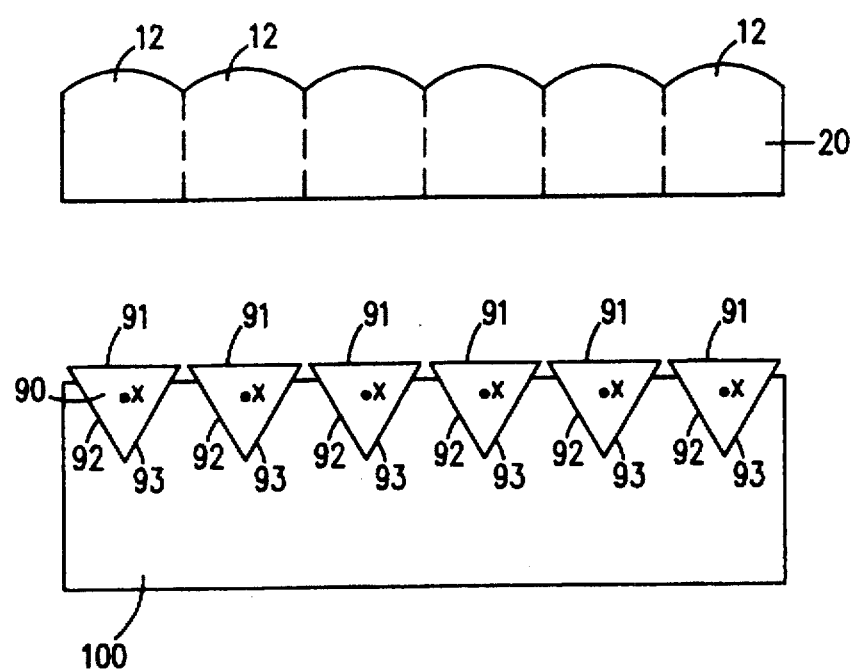
FIG. 7 shows yet another method of producing a lenticular picture with changeable scenes.

FIG. 7 shows yet another method of producing a lenticular picture with changeable scene. In FIG. 7, numeral 20 denotes a trimmed lenticular screen for viewing. Numeral 90 collectively denotes a plurality of triangular columns arranged in a row under the lenticular screen. Each triangular column has a cross-section of an equilateral triangle and a rotating axis denoted by letter x extending through the center of the cross-section. Each triangular column 90 has three narrow rectangular facets 91, 92 and 93 running substantially the length of the column. As shown in FIG. 7, the triangular columns are arranged in a row with all the facets 91 lined up on the focal plane of the lenticules 12. With these arrangement, three different composite images can be printed on the triangular columns to separately provide three different composing scenes as viewed through the lenticular screen 20. With each composite image being sectioned into narrow strips matching the facets, one composite image is printed on facets 91, the other two are separately printed on facets 92 and 93. In order to replace one composite image with another to change the composing scene, all the triangular columns must turn about its rotating axis 120 degrees to replace one facet with another on the focal plane of the lenticules 12. It should be noted that, with this method of making lenticular picture, the focal plane of the lenticules 12 must be sufficient further away from the backside of the lenticular screen 20 to allow the triangular columns to turn without hinderance.

It should be noted that the lenticular screen 20 can be replaced by a barrier strip plate as described in FIG. 2B.

What is claimed is:

1. A lenticular viewing box for viewing a composite image having an array of parallel interleaving image lines composed from at least two 2D images, said lenticular viewing box comprising:

a lenticular screen comprising an array of lenticules having parallel longitudinal axes and a common focal plane, said lenticular screen having a thickness smaller than the confocal thickness;

a holding plate disposed between said focal plane and said lenticular screen to hold down said composite image;

a supporting plate disposed behind said composite image to support said composite image; and at least a pair of guiding blocks located between said supporting plate and said lenticular screen and on the opposite sides of said lenticular screen parallel to the longitudinal axes of said lenticules for guiding said composite image to align with said lenticules and for keeping said composite image on said focal plane; said guiding blocks having a height to define a gap between said lenticular screen and said composite image.

2. The viewing box of claim 1 wherein said holding plates has a thickness smaller than said gap.

3. The viewing box of claim 1 wherein said holding plate has a thickness substantially equal to said gap.

4. The viewing box of claim 1 wherein said holding plate is movably mounted in said viewing box to allow said composite image to be replaced by another composite image.

5. A barrier strip viewing box for viewing a composite image having an array of parallel interleaving image lines composed from at least two 2D images, said barrier strip viewing box comprising:

a barrier strip plate having parallel blocking strips and clear strips alternately arranged to separate said interleaving image lines;

a holding plate disposed between said focal plane and said barrier strip plate to hold down said composite image;

a supporting plate disposed behind said composite image to support said composite image; and at least a pair of guiding blocks located between said supporting plate and said barrier strip plate and on the opposite sides of said barrier strip plate parallel to said clear strips for guiding said composite image to align with said clearing strips; said guiding blocks having a height to define a gap between said barrier strip plate and said composite image.

6. The viewing box of claim 5 wherein said holding plate has a thickness smaller than said gap.

7. The viewing box of claim 5 wherein said holding plate has a thickness substantially equal to said gap.

8. The viewing box of claim 5 wherein said holding plate is movably mounted in said viewing box to allow said composite image to be replaced by another composite image.

* * * * *